(12) United States Patent
Bodin

(10) Patent No.: US 6,443,680 B1
(45) Date of Patent: Sep. 3, 2002

(54) MOUNTING APPARATUS HAVING A SWIVEL HEAD

(75) Inventor: Richard G. Bodin, St. Paul, MN (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/848,658

(22) Filed: May 4, 2001

(51) Int. Cl.[7] ............................ F16B 23/00; F16B 35/00
(52) U.S. Cl. ..................... 411/396; 411/375; 411/383; 411/389
(58) Field of Search ................................. 411/375, 396, 411/389, 383, 384, 6

(56) References Cited

U.S. PATENT DOCUMENTS

| | | | | |
|---|---|---|---|---|
| 2,503,189 A | * | 4/1950 | Biba, Jr. ................ | 411/396 X |
| 4,252,458 A | * | 2/1981 | Keen ..................... | 411/389 X |
| 5,518,351 A | | 5/1996 | Peil ...................... | 411/383 |
| 5,697,746 A | * | 12/1997 | Brown et al. .......... | 411/389 X |
| 6,146,076 A | | 11/2000 | Bodin .................... | 411/433 |
| 6,196,781 B1 | | 3/2001 | Yang ..................... | 411/384 |

* cited by examiner

*Primary Examiner*—Neill Wilson
(74) *Attorney, Agent, or Firm*—Lisa M. Soltis; Mark W. Croll; Donald J. Breh

(57) ABSTRACT

A mounting apparatus is provided. The mounting device including an anchor secured within a cavity of a cap by a lip. The cavity is configured to allow coaxial rotation of the anchor and cap in a first configuration and rotation of the cap about the longitudinal axis of the anchor in a second configuration. The mounting device may further be provided with a collar to prevent the over-insertion of the anchor in use.

10 Claims, 4 Drawing Sheets

US 6,443,680 B1

MOUNTING APPARATUS HAVING A SWIVEL HEAD

BACKGROUND OF THE INVENTION

1. Field of the Invention

The present invention relates generally to hardware and, more particularly, to a mounting assembly for securing equipment to ceiling members.

2. Description of the Related Art

Various devices are available to facilitate mounting of water pipes, electrical conduits, unit heaters and the other equipment to ceilings, ceiling members and walls. For example, when installing automatic sprinkler systems, the water pipes that feed the sprinkler heads must be secured to the ceiling. The pipes are typically secured to the ceiling with a hanger. The hanger must be configured to withstand the weight of the pipes when the pipes are filled with water. Prior devices typically required flange plates secured to the ceiling members with screws or bolts to provide a sufficiently strong mount. The flange plates include an internally threaded socket to mount the hanger. The hangers are typically configured for a particular application and include threads on at least one of its ends to be received by the flange plate. To secure the flange plate, a template was typically required to mark the locations for holes in the ceiling members. Holes were then drilled so that the mounting screws could be inserted through the flange plate and screwed into the holes to secure the flange plate to the ceiling member or other surface. Once the flange plate is installed, the threaded portion of the hanger is threaded into the flange plate's threaded socket. Once the hangers are secured, the pipes may be inserted into the hangers. The sprinkler heads are then mounted on the pipes and the sprinkler system installation is complete.

Those skilled in the art will recognize that the mounting of the prior devices is not only labor-intensive, but the hardware employed tends to be clumsy and bulky. Thus, a need exists for a more simple apparatus for suspending pipe hangers and other structures or supports from a ceiling.

Further, prior devices have typically rigidly mounted the sprinkler systems to the ceiling members. In areas subject to earthquakes, in buildings located adjacent to railroad tracks, or in other areas subject to movement, the rigidly mounted hangers or mounts may become fatigued from the motion of the building. The fatigued hanger or mount is more prone to failure. In the case of sprinkler systems, failure of the mount can result in a discharge of water and significant water damage to the building and any items located within the building. Thus, a need exists for a mounting apparatus that allows for a degree of movement to reduce fatigue. Further, in areas subject to excess vibration, such as a location adjacent air conditioners or other vibrating machinery, the vibration of machinery tends to work screws or bolts loose. Eventually, the screw or bolts can become dislodged from the ceiling resulting in the collapse of the sprinkler system or other system or device secured by the hanger resulting in damage to the building and/or its contents. Thus, a need exists for an apparatus for suspending items from a ceiling or other surface that may dampen the vibration and reduce the likelihood of the apparatus working itself loose over time.

An additional problem with mounting devices to angled ceilings is that the mounting devices are typically screwed in perpendicular to the plane of the roof. For example, in Z-purlin buildings, the roof and ceiling typically have a shallow pitch from between 2–12 to 4–12. Once secured, the mount's longitudinal axis is typically not perpendicular to the floor. Thus, a hanger which is typically a solid rod does not hang plumb when secured to the mount. If left at an angle, both the hanger and the Z-purlin are subject to an undesirable torque. Therefore, the hanger must be bent or a specialized hanger manufactured so that when installed the hanger is plumb regardless of the angle of the structure to which the mounting device is attached. The bending of metal hanger can fatigue the metal and reduce its strength and alternatively, the specialized manufacture of specialty hangers is expensive. Thus, a need exists for a mount that can secure hangers or similar devices to ceilings without necessitating modification of the device or specialized manufacture for the particular pitch of the ceiling.

The present invention meets the above needs and provides additional improvements and advantages that will be recognized by those skilled in the art upon review of the specification and figures.

SUMMARY OF THE INVENTION

The present invention is an article of manufacture comprising an anchor member in the form of a screw having a head secured to a proximal of a shaft and a cap member that has a first cavity and a second cavity, the two being concentric with one another. The first cavity of the cap member includes a first region and a second region. The first region is shaped to securably receive the head of the anchor member such that when the cap is rotated, the anchor member also rotates therewith. The second region is sized to movably receive the head of the anchor member therein. The cap member further includes an inwardly turned lip to retain the head within the first cavity while allowing limited swiveling of the anchor member relative to the cap member.

DETAILED DESCRIPTION OF THE INVENTION

The present invention provides an apparatus for securing an article from a ceiling or structure, such as Z-purlin, a metal I-beam, a wooden rafter or a reinforced concrete surface. The apparatus is described and illustrated in the context of a mount for a sprinkler system to secure to a ceiling support for exemplary purposes only. Those skilled in the art will recognize the applicability of the present invention for securing a variety of structures to ceilings, support structures, walls and floors.

Figure 1:
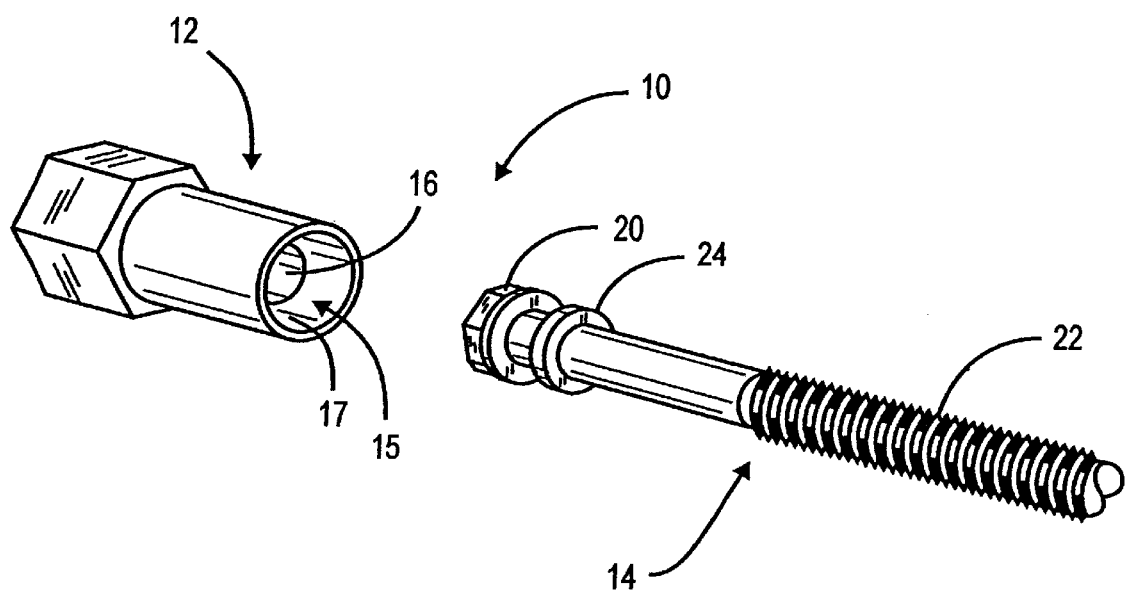
FIG. 1 illustrates an exploded perspective view of a mounting apparatus in accordance with the present invention.

FIG. 1 illustrates an exploded view of a mounting apparatus 10 in accordance with the present invention. The mounting apparatus 10 includes a cap 12 and an anchor 14. Cap 12 and anchor 14 are typically formed from a metal such as steel, although materials such as nylon or plastic may have sufficient strength for certain applications. Cap 12 may be externally shaped as a hex nut or may be otherwise shaped to facilitate the application of a rotational force about the longitudinal axis of the cap. Cap 12 further includes a first cavity 15 at a first end of cap 12 and a bore 18, shown in FIGS. 2A and 2B, formed inward from a second end of cap 12. First cavity 15 further includes a bore 16 and a counterbore 17. Counterbore 17 is shaped to contain a head 20 of a self-tapping screw anchor 14, discussed below, comprising a second component of the anchor and to allow a rotational force applied to cap 12 to be conferred to anchor 14. Counterbore 17 is sized to allow movement of head 20 while head 20 is positioned there within. Bore 18 may be threaded or is otherwise configured to secure a hanger or other mounting structure to cap 12.

Anchor 14 generally includes a head 20 and a shaft 22. Shaft 22 may also include a collar 24 which functions to limit the distance which threaded shaft 22 can be inserted into base material 50. That is, the advancement of anchor 14 is limited by collar 24 abutting base material 50 during attachment.

For exemplary purposes, anchor 14 is shown as a self-drilling, self-tapping screw 34 having a drill point 36 on one end, as shown in FIG. 2. Drill point 36 may include helically oriented flutes 40 ground into the tip and terminating in a point 42. Head 20 is sized to fit within first cavity 15 (FIG. 1). Alternatively, anchor 14 may take the form of a wood screw, a bolt, a self-tapping screw, or other anchoring configuration that will be recognized by those skilled in the art upon review of the present disclosure. Typically, head 20 is hexagonal-shaped in longitudinal cross-section, although the head may be polygonal-shaped or otherwise-shaped to allow a rotational force to be conferred to shaft 22 when the cap 12 is rotated. Further, first cavity 15 and the bore 18 may comprise a continuous bore along the longitudinal axis of cap 12. In such a configuration, counterbore 17 may be configured to prevent the extension of the hanger through the bore 18 into the counterbore so as to prevent the rotation of head 20 within counterbore 17 of first cavity 15.

Figure 2A:
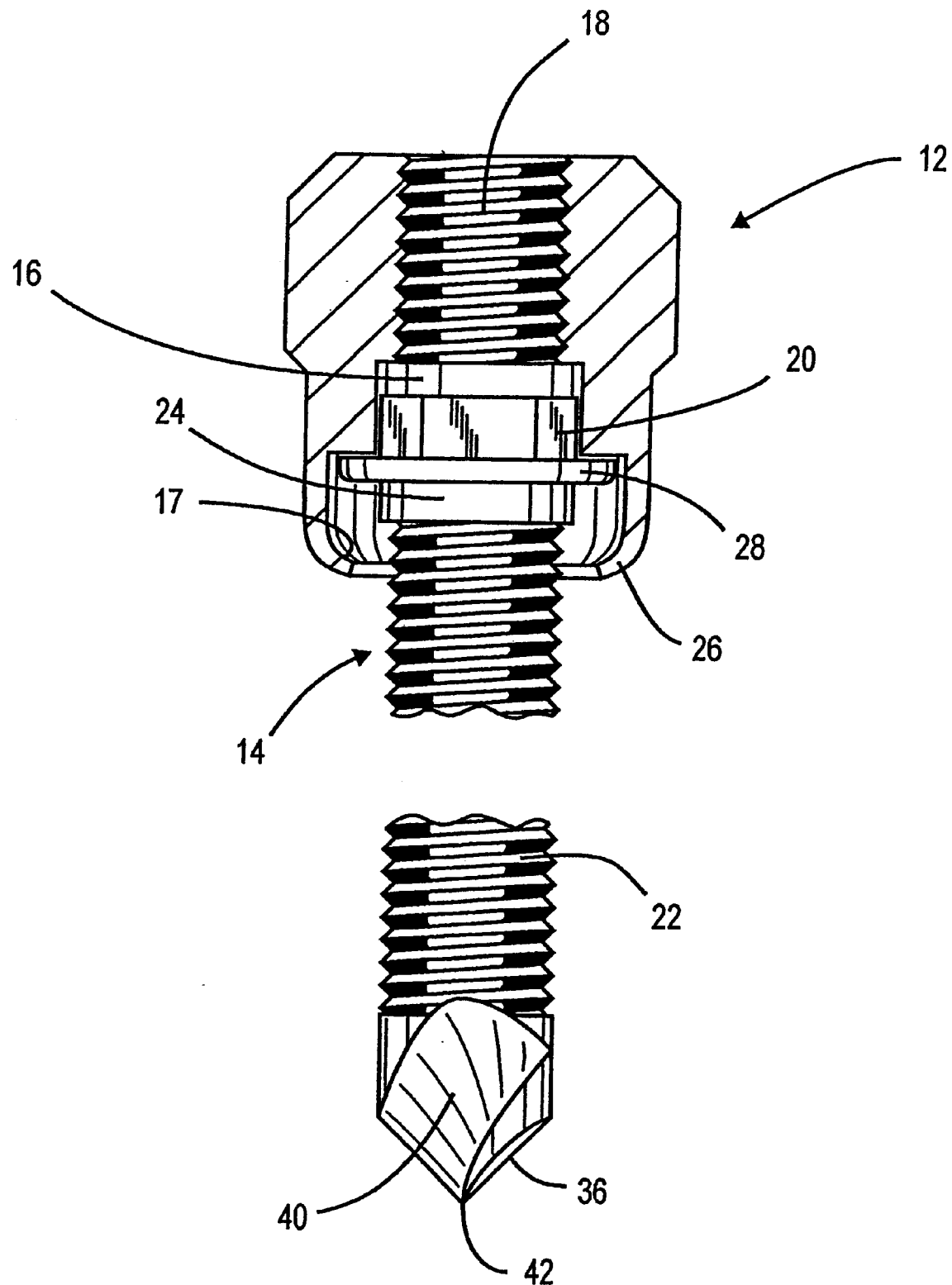
FIG. 2A illustrates a side elevation of a mounting apparatus in accordance with the present invention.
Figure 2B:
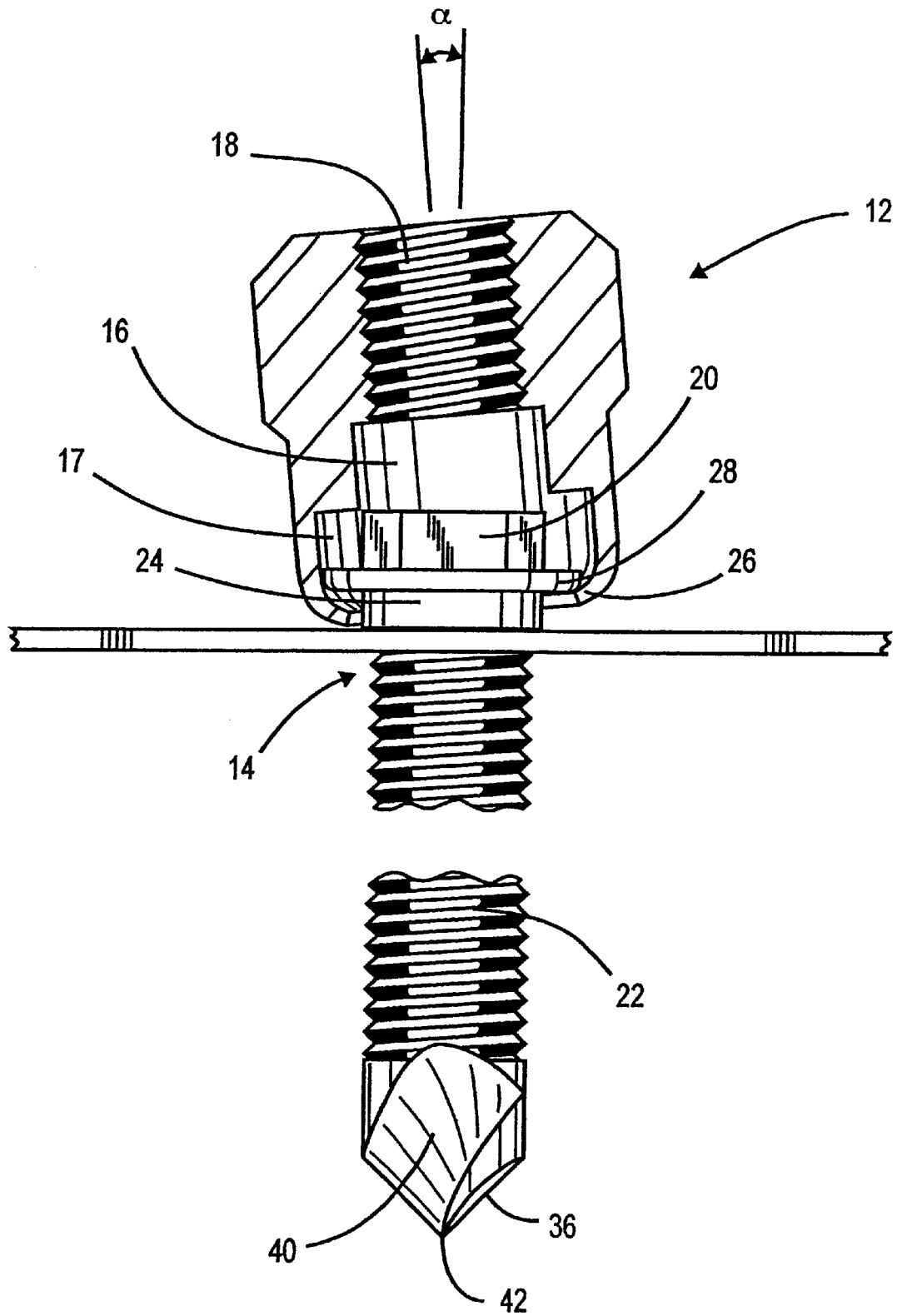
FIG. 2B illustrates a side elevation of the mounting apparatus of FIG. 2A in a second configuration.

FIGS. 2A and 2B illustrate partial cross-sections through cap 12 of an embodiment of the present invention illustrating alternative positioning of head 20 within first cavity 15. Further, FIGS. 2A and 2B illustrate the threaded bore 18, which is configured to receive a threaded hanger, although the bore 18 may be alternatively configured to securably receive alternatively configured elements.

FIGS. 2A illustrates a configuration of an embodiment of mounting apparatus 10 prior to securing anchor 14 within a ceiling member. In FIG. 2A, head 20 is positioned within the counterbore region 16 of first cavity 15.

Region 16 of first cavity 15 mates with the head 20 to allow a rotational force to be conferred on anchor 14.

FIGS. 2B illustrates a configuration of an embodiment of mounting apparatus 10 after securing anchor 14 within a ceiling member 50. In FIG. 2B, shaft 22 has been inserted into a sealing member 50 until collar 24 thereon abuts the base material. Further, head 20 is shown within the bore 17 of cavity 15 where it is free to float within limits. An inwardly turned lip 26, created by staking the base of the cap 12, retains head 20 within the first cavity 15. Head 20 may be sized larger than the diameter of lip 26 to maintain head 20 within cavity 15. Alternatively, a washer 28 may be used to retain head 20 within cavity 15. Washer 28 is typically positioned between head 20 and collar 24 on shaft 22. Washer 28 typically has an outside diameter greater than the diameter formed by lip 26. Thus, washer 28 retains head 14 within first cavity 15. In another embodiment, washer 28 may be integral with collar 24 effectively forming a flange on collar 24. The washer may also have a convex bottom edge to cooperate with the concave surface of the lip.

Figure 3:
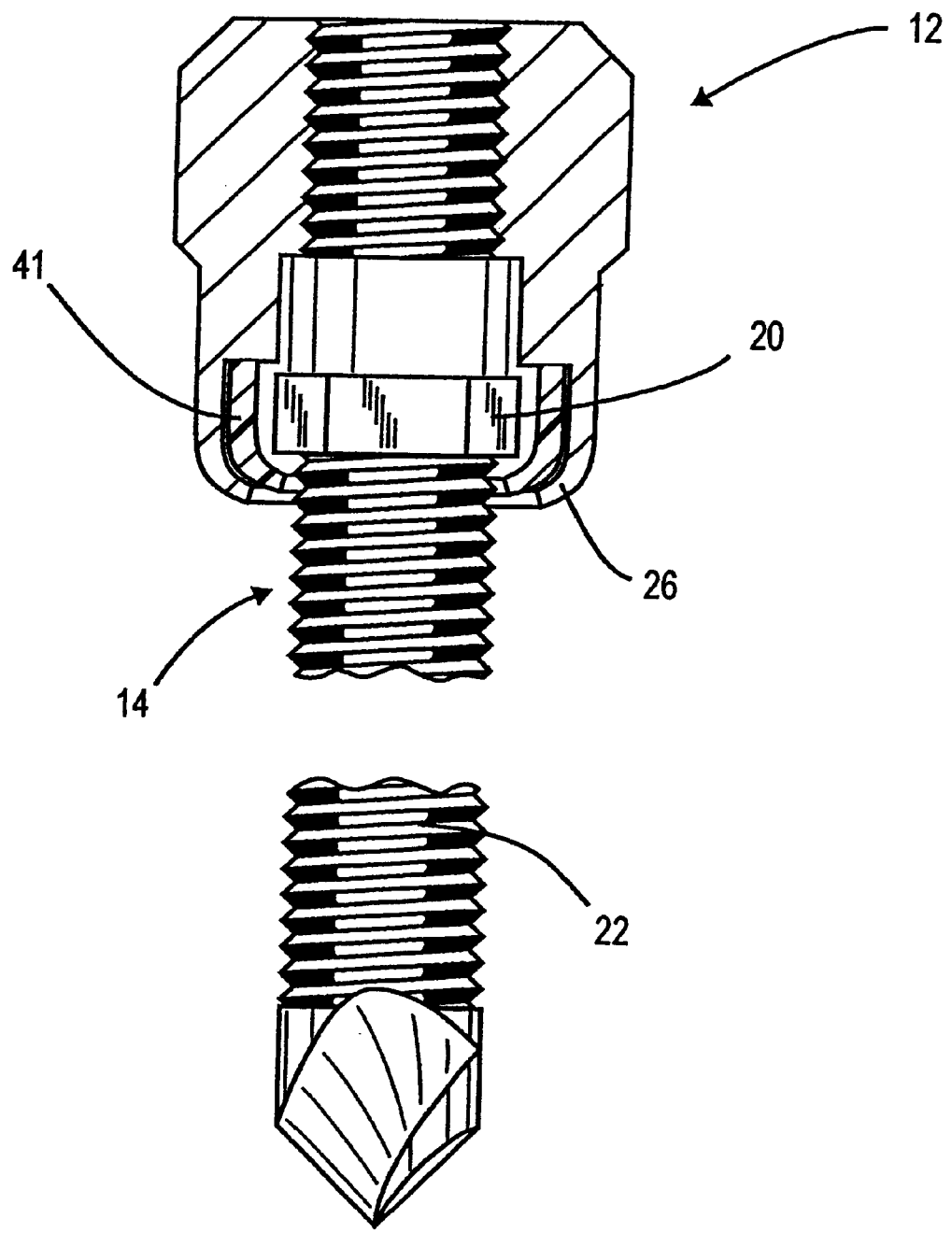
FIG. 3 illustrates a side elevation of an alternative embodiment of a mounting apparatus in accordance with the present invention.

FIG. 3 illustrates an alternative embodiment of a mounting apparatus 10 further including a dampening element 41. Dampening element 41 is typically formed from rubber, nylon or plastic and is inserted between lip 26 of cap 12 and either head 20, washer 28, or the flange of collar 24 of anchor 14. Dampening element 41 may take the form of a rubber washer positioned around shaft 22 during manufacture. Generally, dampening element 41 functions to dampen vibration transfer between the device mounted to mounting apparatus 10 and base material 50.

An exemplary configuration for a mounting apparatus 10 may include cap 12 having a proximal end configured as a standard ⅝" nut formed from screw machine stock. The distal end, prior to forming lip 24, may be 0.40". Bore 18 may have ¼-20 threads. Further, anchor 14 may be a self-tapping screw having an approximately ¼" diameter and a drill tip. Such a device has a tensile strength in excess of 5,000 lbs. before the screw portion separates. Pull tests have indicated that the anchor of the present invention is capable of supporting a load of over 1,500 lbs. when screwed into a wood beam, which is more than adequate to support loads, such as an overhead sprinkling system where the anchor assemblies 10 are placed at intervals of 15 ft. or less. It is also possible to thread a nut onto the shaft 22 of the anchor if desirable.

In use, a specially designed socket wrench member (not shown) is typically provided. The socket is mounted into the chuck of a power drill. Cap 12 is inserted into the socket with the shaft 22 extending outwardly and head 20 pushed within counterbore region 16. Anchor 14 is advanced through base material 50 until collar 24 abuts the base material, at which point head 20 is displaced from counterbore 16 into region 17 where it is free to float. A hanger may then be secured within threaded bore 18 of the cap 12. Typically, the hanger is inserted into the threaded bore 18 while head 20 is fitted into the cavity 16. Once the hanger is secured, head 20 may be displaced from counterbore 16 into region 17 where the head is able to float, being retained only by the lip 26, as shown in FIG. 2B. Once head 20 is positioned within region 17, cap 12 and the attached hanger may be rotated relative to anchor 14 and angled relative to the longitudinal axis of anchor 14.

During manufacture, head 20 is typically crimped within the proximal end of cavity 15. The mounting assembly is subjected to a swaging operation to form lip 26. To swage the assembly a forming tool engages the distal edge of first cavity 15 and rolls the edge over upon impact to form lip 26. Thus, head 20 is held within first cavity 15 and anchor 14 is connected to cap 12. Because the cap 12 can be swiveled or tilted at an angle a as shown in FIG. 2B, it is possible to advance the self-drilling anchor 14 into a non-horizontal sealing member, yet allow a threaded rod fitted into the bore 18 to hang true vertical.

This invention has been described herein in considerable detail in order to comply with the Patent Statutes and to provide those skilled in the art with the information needed to apply the novel principles and to construct and use such specialized components as are required. However, it is to be understood that the device details and uses therefore can be made without departing from the scope of the invention itself.

What is claimed is:

1. A hardware item, comprising:
   an anchor member comprising a head secured to the proximal end of a shaft; and
   a cap member comprising a first cavity and a second cavity concentric with one another, the first cavity including a first region and a second region, the first region shaped to drivingly receive the head of the anchor member and the second region sized to movably receive the head and the cap member including a lip to retain the head within the first cavity.

2. A hardware item, as in claim 1, further comprising a collar secured to the shaft.

3. A hardware item, as in claim 1, wherein the shaft of the anchor member comprises one of a self-tapping screw, a bolt, a wood screw, and a sheet metal screw.

4. A hardware item, as in claim 1, wherein the anchor member is composed of a material selected from the group consisting of metal and plastic.

5. A hardware item, as in claim 1, where in the cap member is composed of a material selected from the group consisting of metal and plastic.

6. A hardware item, as in claim 1, wherein the head of the anchor member comprises a polygon.

7. A hardware item, as in claim 2, further comprising a flange extending from the collar.

8. A hardware item, as in claim 1, further comprising a washer positioned between the head of the anchor member and the lip of the cap member.

9. A hardware item, as in claim 2, further comprising a washer positioned between the head and the collar on the shaft of the anchor member.

10. A hardware item, as in claim 1, further comprising a dampening member positioned between the head of the anchor member and the lip of the cap member.

* * * * *